United States Patent
Duguay

(10) Patent No.: US 11,565,919 B2
(45) Date of Patent: Jan. 31, 2023

(54) LABORATORY LIFT MECHANISM

(71) Applicant: Sony Corporation, Tokyo (JP)

(72) Inventor: Michael L. Duguay, Gardner, MA (US)

(73) Assignee: Sony Corporation, Tokyo (JP)

(*) Notice: Subject to any disclaimer, the term of this patent is extended or adjusted under 35 U.S.C. 154(b) by 108 days.

(21) Appl. No.: 17/182,599

(22) Filed: Feb. 23, 2021

(65) Prior Publication Data

US 2022/0267126 A1    Aug. 25, 2022

(51) Int. Cl.
| | | |
|---|---|---|
| *B66F 3/00* | (2006.01) | |
| *B66F 3/35* | (2006.01) | |
| *B66F 3/42* | (2006.01) | |
| *G01N 15/14* | (2006.01) | |
| *F16B 1/00* | (2006.01) | |

(52) U.S. Cl.
CPC .............. *B66F 3/35* (2013.01); *B66F 3/42* (2013.01); *F16B 2001/0028* (2013.01); *G01N 15/14* (2013.01)

(58) Field of Classification Search
CPC ............. B66F 3/00; B66F 3/35; B66F 3/42
See application file for complete search history.

(56) References Cited

U.S. PATENT DOCUMENTS

| | | | | |
|---|---|---|---|---|
| 4,896,869 A | * | 1/1990 | Takekoshi | B23Q 1/623 269/309 |
| 7,273,587 B1 | * | 9/2007 | Birkner | G01N 1/31 422/65 |
| 2004/0002154 A1 | * | 1/2004 | Palsson | G01N 33/48 435/7.1 |
| 2016/0051426 A1 | * | 2/2016 | Hall | A47C 7/002 254/93 HP |
| 2019/0270627 A1 | | 9/2019 | Hodson | |
| 2020/0002141 A1 | * | 1/2020 | Dissing | B66F 3/35 |
| 2022/0267126 A1 | * | 8/2022 | Duguay | B66F 3/35 |

OTHER PUBLICATIONS

"Rotary Platform Lift Table", Mornlift, 2020, retrieved from https://www.mornlift.com/scissor-lift/rotary-platform-lift-table-2/.
"Rotating Dollies", GKS, Sep. 1, 2014, retrieved from https://www.gksweb.com/rotating-dollies/rotating-dollies.html.

* cited by examiner

*Primary Examiner* — Lee D Wilson
(74) *Attorney, Agent, or Firm* — John L. Rogitz

(57) ABSTRACT

A laboratory lift mechanism includes a platen rotatably engaged with a base in a laboratory cabinet. The platen can support a heavy piece of laboratory equipment. Lift bags are engaged with the base and can be inflated to raise the base with the laboratory equipment.

17 Claims, 3 Drawing Sheets

LABORATORY LIFT MECHANISM

FIELD

The present application is directed to laboratory lift mechanisms.

BACKGROUND

Present principles understand that laboratory work often involves relatively heavy equipment that may from time to time need to be moved. For example, flow cytometry equipment such as Sony's SHA 800 used to identify/sort cells in biosamples can be heavy (e.g., 250 pounds or more) yet may require lab technicians to move the equipment for use or repair. This problem is often further complicated by the heavy equipment being disposed in the laboratory in a tight space such as a cabinet.

SUMMARY

Accordingly, a mechanism is provided to allow a laboratory technician such as an engineer to safely lift and turn laboratory equipment up to 360 degrees, allowing easier access to areas of the equipment with minimum effort. The mechanism provides for compact operation to account for minimal space for moving the equipment. Various limits and options are provided to allow for lifting and, if desired, rolling to assist moving equipment around benches and floors with safe and minimal effort.

In one aspect, an assembly includes a flow cytometry apparatus disposed in a laboratory cabinet. The assembly also includes a platen supporting the flow cytometry apparatus in the laboratory cabinet, and a base coupled to the platen to permit the platen to rotate relative to the base to thereby rotate the flow cytometry apparatus. The apparatus further includes plural inflatable lift bags engaged with a bottom of the base. At least one source of air is connected to at least one of the lift bags to inflate the lift bag and raise the base with platen and flow cytometry apparatus.

In example embodiments the platen and the base may be disk-shaped. If some implementations the platen can include an axle and the base can include a receptacle, and the axle is rotatably received in the receptacle.

In example implementations a locking mechanism prevents rotatable motion of the platen relative to the base.

The source of air may include a manually actuated pump, and if desired plural sources of air may be connected to respective inflatable lift bags.

Also, plural hook and loop fasteners may be provided for connecting respective inflatable lift bags to the base.

In another aspect, an apparatus includes at least one platen having a top surface configured to support an object and a bottom surface opposite the top surface. The apparatus also includes at least one base below the bottom surface and coupled to the platen to permit rotatable motion of the platen relative to the base. Plural lift bags are provided with plural fasteners coupling the lift bags to the base to raise the base responsive to the lift bags being inflated.

In another aspect, a method includes disposing a piece of equipment in a laboratory cabinet, engaging the piece of equipment with a rotatable surface in the cabinet, and raising the rotatable surface in the cabinet.

The details of the present application, both as to its structure and operation, can best be understood in reference to the accompanying drawings, in which like reference numerals refer to like parts, and in which:

DETAILED DESCRIPTION

Figure 1:
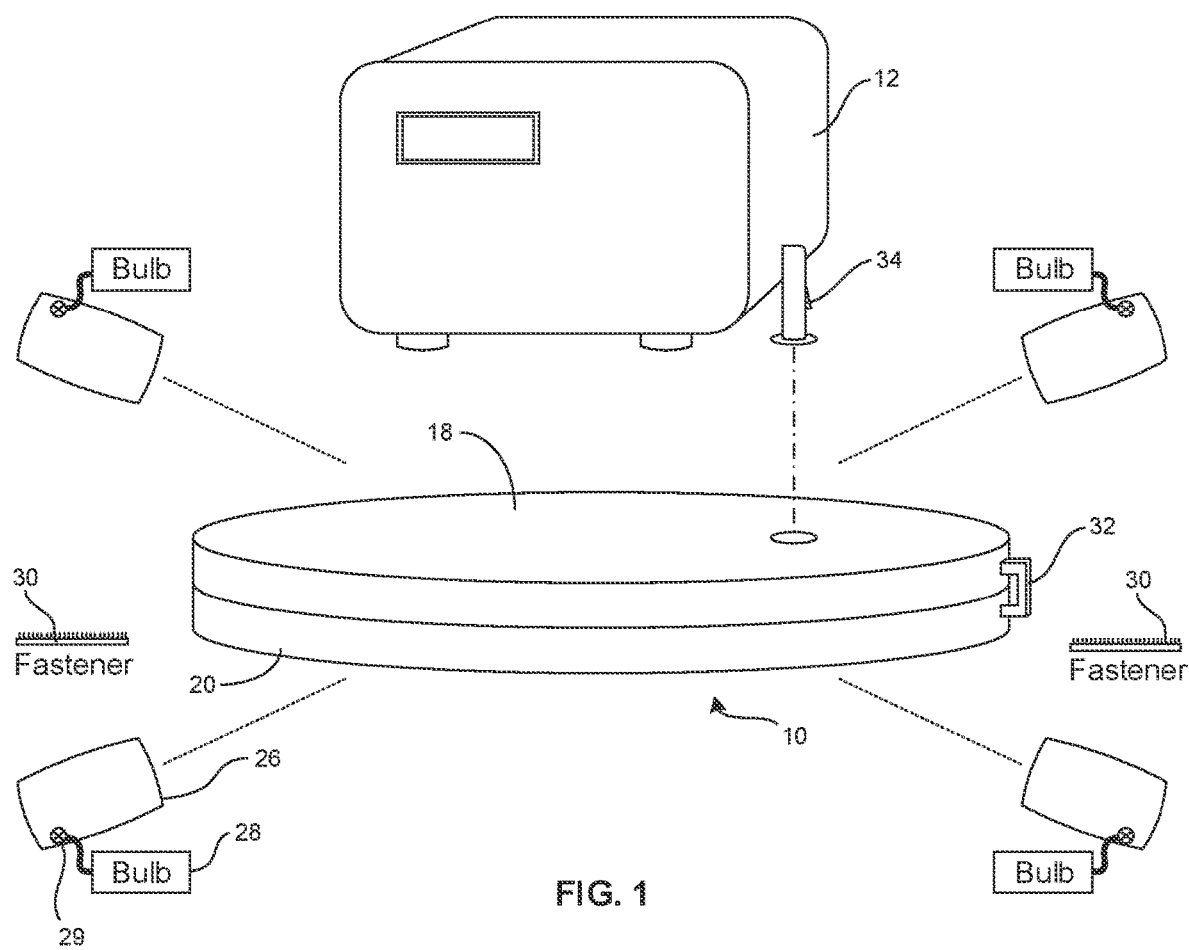
FIG. 1 is an exploded view of the support assembly with laboratory equipment in an example implementation.
Figure 3:
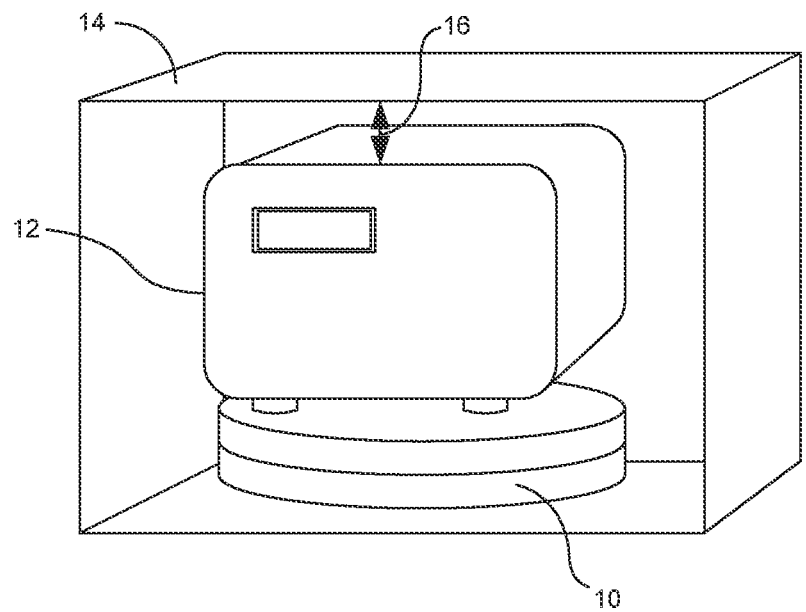
FIG. 3 is a perspective view of the laboratory equipment inside a cabinet, resting on the support assembly.

Referring to FIGS. 1 and 3, an assembly 10 supports a laboratory or other equipment 12 such as a flow cytometry apparatus that may be heavy (e.g., 250 pounds or more) and that may be disposed in a constrained space, such as a laboratory cabinet 14 (FIG. 3). Indeed, the clearance 16 between the top of the equipment 12 and the top inside surface of the cabinet 14 may be only an inch or two, although other clearances are envisioned.

Figure 2:
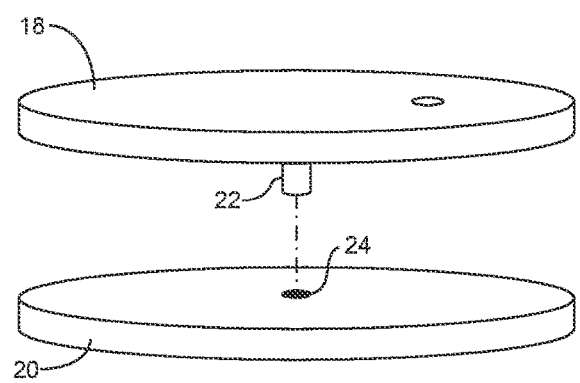
FIG. 2 is an exploded view showing the platen and base.

Considering FIGS. 1 and 2, the assembly 10 includes a platen 18, which may be disk-shaped, supporting the equipment 12 in the laboratory cabinet, and a base 20 (which may also be disk-shaped, and which may be substantially the same size as the platen) coupled to the platen 18 to permit the platen 18 to rotate relative to the base 20 to thereby rotate the equipment 12. In one example (FIG. 2), the platen 18 includes an axle 22 centrally located in the platen and the base 20 can include a receptacle 24 to rotatably receive the axle.

Figure 4:
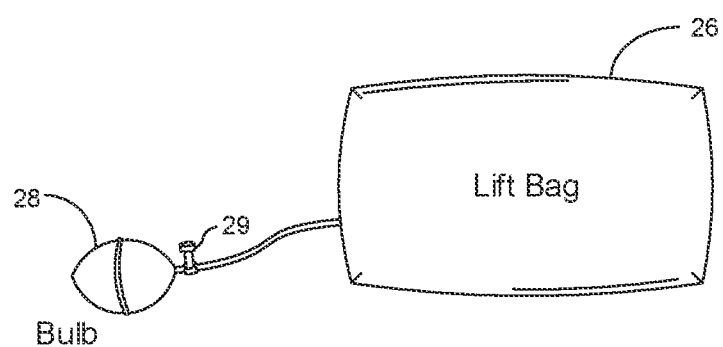
FIG. 4 schematically illustrates a bulb connected to a lift bag to inflate and deflate the lift bag.

As shown in FIG. 1, the apparatus 10 further includes plural (e.g., two or four or other number) inflatable lift bags 26 engaged with a bottom of the base 20. As shown in FIGS. 1 and 4, at least one source 28 of air and in the example shown, plural sources of air, one for each lift bag, is fluidly connected to the lift bag(s) inflate the lift bag and raise the base 20 with platen 18 (and, hence, the equipment 12). The source 28 of air may be established by a manually-actuated pump such as a "bulb". A valve 29 may be provided to relieve air pressure and cause the lift bag(s) to deflate.

Also, plural hook and loop fasteners 30 may be provided for connecting respective inflatable lift bags 26 to the base 20, e.g., to the bottom of the base.

In example implementations one or more locking mechanisms 32 may be provided to prevent rotatable motion of the platen 18 relative to the base 20. The locking mechanism 32 may be established by a rigid L-shaped bracket that can be moved toward and away from the platen to grip the platen, or a flexible strap that can be formed with a hole to engage a detent on the platen, or other structure.

Similarly, an equipment lock 34 may be provided to hold or lock the equipment 12 onto the platen 18. The equipment lock 34 may be structurally similar or the same as the locking mechanism 32.

Figure 5:
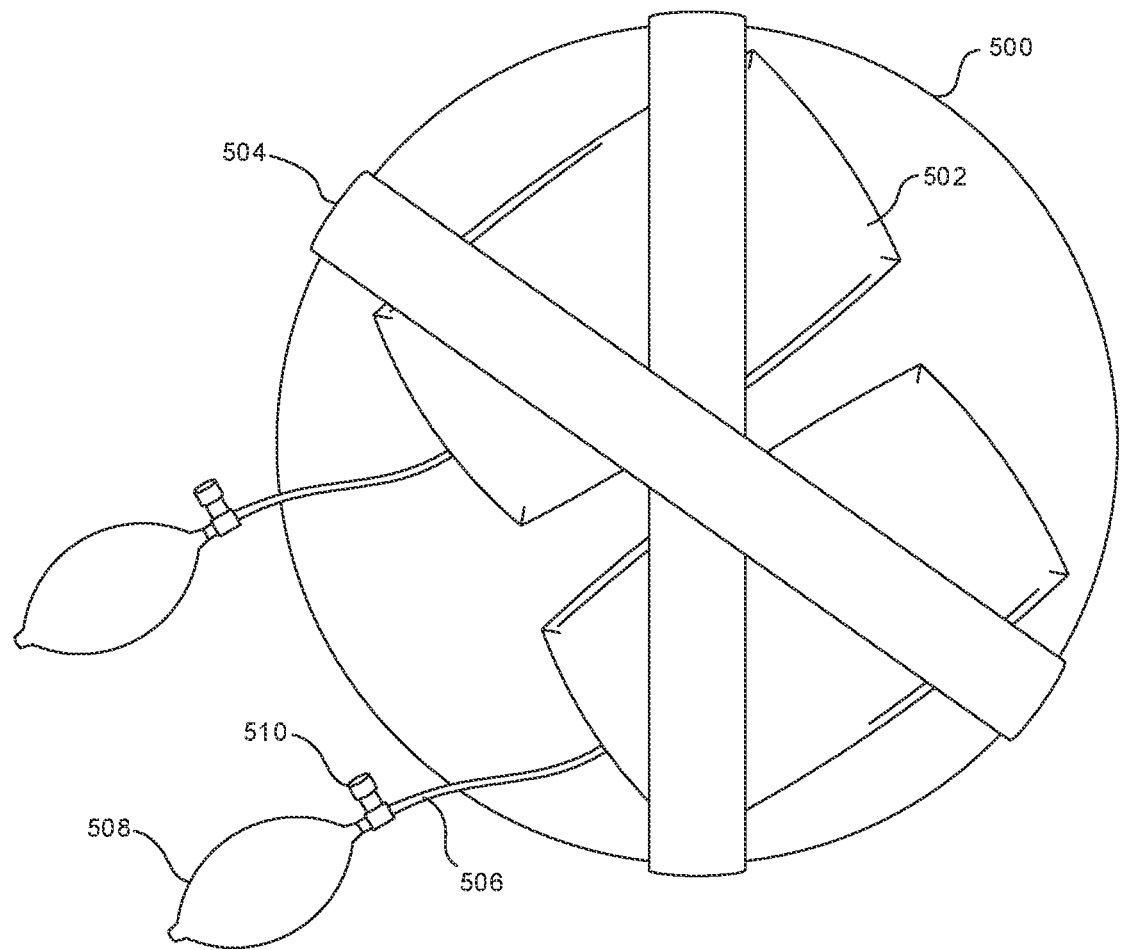
FIG. 5 illustrates a specific embodiment with two lift bags engaged with the bottom of the base.

FIG. 5 shows a specific embodiment from the bottom of a base 500 that supports a rotatable platen according to principles herein. First and second elongated rectilinear inflatable lift bags 502 are held onto the bottom the base 500 by first and second hook and loop straps 502 extending from rim to rim of the base as shown. Greater or fewer lift bags and straps may be used. Each lift bag may be inflated via a respective air line 506 by a respective squeeze bulb 508 which when squeezed inflates the respective lift bag. A relief valve 510 may be associated with each squeeze bulb and may be operated to vent air from the respective lift bag to deflate the bag.

While the particular LABORATORY LIFT MECHANISM is herein shown and described in detail, it is to be understood that the subject matter which is encompassed by the present invention is limited only by the claims.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

What is claimed is:

1. An assembly, comprising:
   a flow cytometry apparatus disposed in a laboratory cabinet;
   a platen supporting the flow cytometry apparatus in the laboratory cabinet;
   a base coupled to the platen to permit the platen to rotate relative to the base to thereby rotate the flow cytometry apparatus;
   plural inflatable lift bags engaged with a bottom of the base; and
   at least one source of air connected to at least one of the lift bags to inflate the lift bag and raise the base with platen and flow cytometry apparatus.

2. The assembly of claim 1, wherein the platen is disk-shaped.

3. The assembly of claim 1, wherein the base is disk-shaped.

4. The assembly of claim 1, wherein the platen comprises an axle and the base comprises a receptacle, and the axle is rotatably received in the receptacle.

5. The assembly of claim 1, comprising a locking mechanism to prevent rotatable motion of the platen relative to the base.

6. The assembly of claim 1, wherein the source of air comprises a manually actuated pump.

7. The assembly of claim 1, comprising plural sources of air connected to respective inflatable lift bags.

8. The assembly of claim 1, comprising plural hook and loop fasteners connecting respective inflatable lift bags to the base.

9. An apparatus comprising:
   at least one platen having a top surface configured to support an object and a bottom surface opposite the top surface;
   at least one base below the bottom surface and coupled to the platen to permit rotatable motion of the platen relative to the base;
   plural lift bags; and
   plural fasteners coupling the lift bags to the base to raise the base responsive to the lift bags being inflated.

10. The apparatus of claim 9, comprising at least one source of air connected to at least one of the lift bags to inflate the lift bag and raise the base with platen.

11. The apparatus of claim 9, wherein the platen is disk-shaped.

12. The apparatus of claim 9, wherein the base is disk-shaped.

13. The apparatus of claim 9, wherein the platen comprises an axle and the base comprises a receptacle, and the axle is rotatably received in the receptacle.

14. The apparatus of claim 9, comprising a locking mechanism to prevent rotatable motion of the platen relative to the base.

15. The apparatus of claim 9, wherein the source of air comprises a manually actuated pump.

16. The apparatus of claim 9, comprising plural sources of air connected to respective inflatable lift bags.

17. The apparatus of claim 9, wherein the plural fasteners coupling the lift bags to the base comprise plural hook and loop fasteners connecting respective inflatable lift bags to the base.

* * * * *